March 18, 1924.  1,487,033
T. SLOPER
APPARATUS FOR MAKING THE COVERS OF PNEUMATIC TIRES
Filed Feb. 12, 1920   5 Sheets-Sheet 2
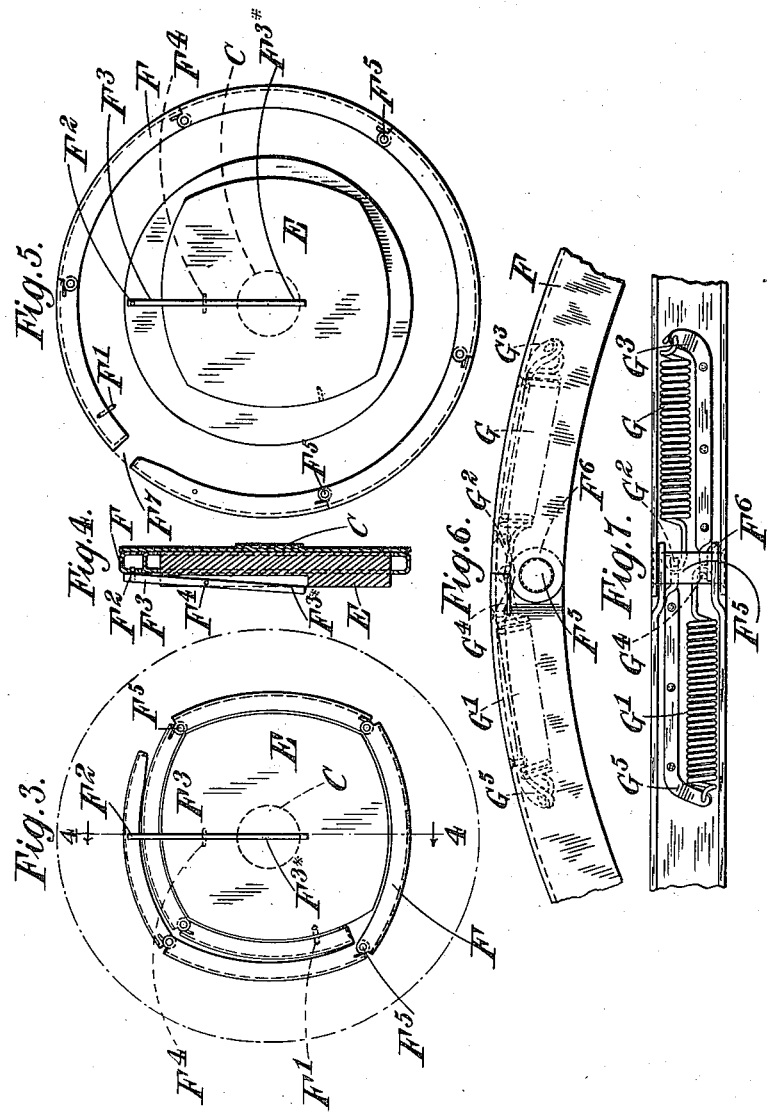
INVENTOR March 18, 1924.  1,487,033
T. SLOPER
APPARATUS FOR MAKING THE COVERS OF PNEUMATIC TIRES
Filed Feb. 12, 1920     5 Sheets-Sheet 4
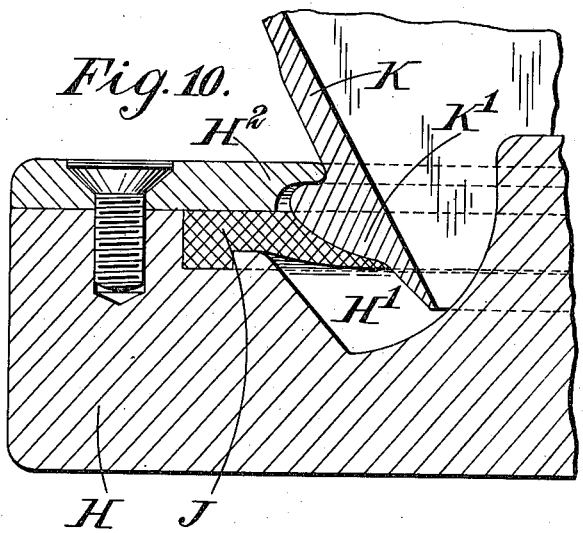
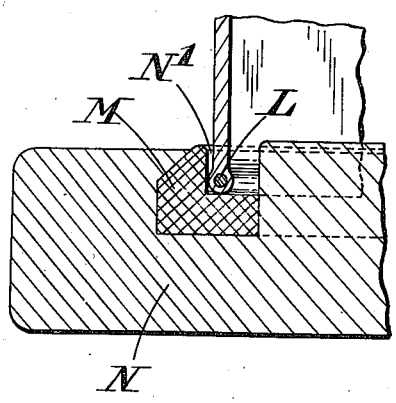
INVENTOR March 18, 1924.  1,487,033
T. SLOPER
APPARATUS FOR MAKING THE COVERS OF PNEUMATIC TIRES
Filed Feb. 12, 1920   5 Sheets-Sheet 5

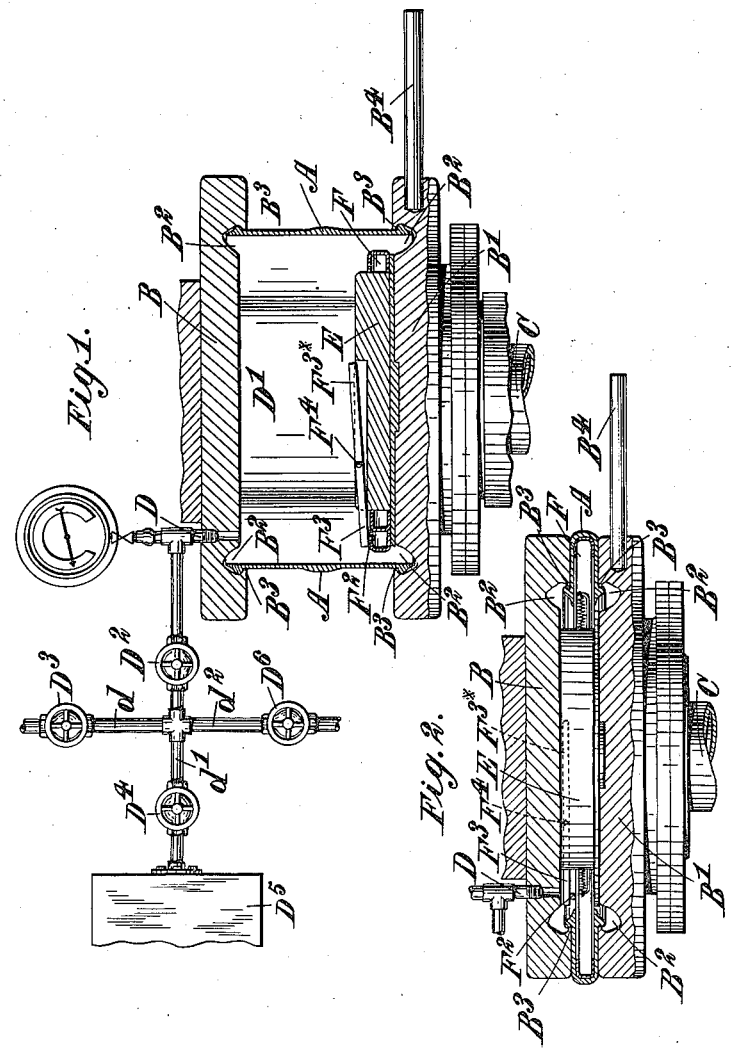

INVENTOR

Patented Mar. 18, 1924.

1,487,033

UNITED STATES PATENT OFFICE.

THOMAS SLOPER, OF DEVIZES, ENGLAND.

APPARATUS FOR MAKING THE COVERS OF PNEUMATIC TIRES.

Application filed February 12, 1920. Serial No. 358,216.

*To all whom it may concern:*

Be it known that I, THOMAS SLOPER, a subject of the King of England, residing at Devizes, Wiltshire, in England, have invented certain new and useful Improvements in Apparatus for Making the Covers of Pneumatic Tires, of which the following is a specification.

This invention relates to apparatus for the manufacture of pneumatic tires.

Generally speaking, a tire-cover, that is to say, the restraining fabric for an inner pneumatic tube, is partially vulcanized on a drum or former, the surface of which is approximately flat in a direction parallel to its axis. A flat flexible endless band is thus obtained which is subsequently, before the final vulcanizing process, expanded into the form which it is desired that it shall have. The appliances at present employed for this purpose, however, such as a mechanically expanded ring, have been found to produce local strains in the substance of the cover, which frequently develop into premature defects when the tire is in use.

By the term "flat band" as applied above, is meant a band of which the inner surface is approximately flat in cross-section, although the thickness of such a band is not necessarily uniform, and its outer surface, which eventually forms the tread of the tire, may be ribbed or otherwise formed in the usual manner.

It has previously been proposed to bring these tire-bands to approximately tire-cover shape by mounting the flat annular band on a drum with a collapsed pneumatic tube disposed in a channel in the face of the drum, and then pushing the edges of the band towards each other as the pneumatic tube is inflated. With this arrangement there is no means for preventing stretch of the edges of the tire-band except their own construction and there is no means for keeping the tire-cover in shape during vulcanization unless the inflated tube remains in it, which is a costly method because the tubes are destroyed by the repeated heating after use with a few covers.

An important object of this invention is to obviate the employment of a pneumatic tube as used heretofore for expanding a flat endless band and retaining the same expanded during vulcanization, and to provide mechanical, non-pneumatic means whereby the band shaped under pneumatic pressure can be retained in an extended condition after the pneumatic pressure has been withdrawn and during vulcanization.

Another object is to hold the tire-band during its inflation under pneumatic pressure in an improved manner such that its edges shall be prevented from stretching owing to the provision of holding means other than those comprised in the edges.

A further object is to provide that during the expansion of the band under pneumatic pressure, all the parts of the band shall be stressed as uniformly as possible.

A still further object is to provide retaining means for the expanded band in the form of an expansible ring so arranged that it can be expanded against the inner periphery of the tire-band whilst the latter is in the expanded condition to hold it in the expanded condition after the pneumatic pressure has been relieved. This expansible retaining-ring may be one which automatically expands and may be provided with restraining-means and a release therefor operable automatically or otherwise, so that it is not allowed to expand until such time is the tire has been subjected to a given degree of expansion.

To these and other ends the invention consists in the construction, arrangement and combination of parts described hereinafter and pointed out in the claims.

One embodiment of the invention is illustrated by way of example in the accompanying drawings wherein:—

Figure 1 is a central vertical section through one form of apparatus according to the invention with the tire-band in place but not yet subjected to fluid-pressure;

Figure 2 is a section through the apparatus with the parts in the position occupied when the tire-band is expanded under fluid-pressure and the retaining-ring has been released therein;

Figure 3 is an enlarged plan of the retaining-ring and its restraining and releasing mechanism, Figure 4 is an elevation of the same and Figure 5 is a plan of the parts shown in Figure 3 but with the retaining-ring expanded.

Figure 6 is an enlarged plan of part of the retaining ring showing the arrangement of the springs therein and Figure 7 is a view of these parts from within the ring;

Figure 10 shows the same parts in section with the tire-band in the position it occupies as expansion begins;

Figure 11 is a section through the same parts in modified form showing another form of tire-band in place prior to expansion;

The same letters indicate the same parts throughout the drawings.

Figure 8:
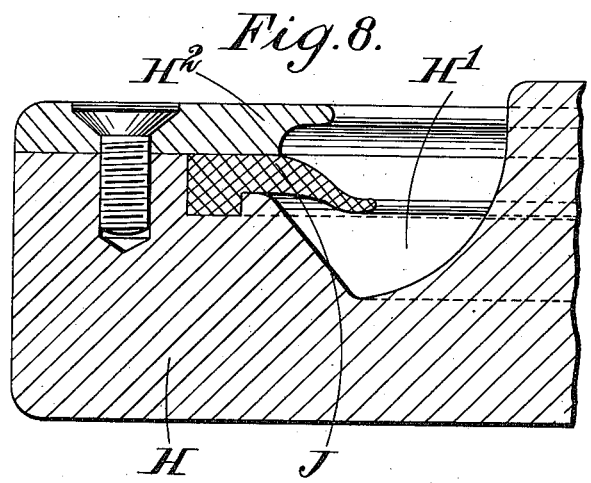
Figure 8 is a section through that portion of one of the plates wherein the annular recess for receiving the tire-band edge is formed.

The flat tire-band A is built up in the usual manner on a drum or former, and is preferably partially vulcanized before inserting it between the plates B, B¹. These plates are provided with recesses B² to receive the edges of the tire-band, and the top plate is fixed to the head of a press and the bottom plate is carried by a ram C. The outer edge B³ of each recess is shaped to provide a lip which bears against the outer face of the band at the point where the bead adjoins the main body of the band, and the recess is shaped to allow room for the bead to swing round as the centre of the band is expanded outwards in the manner hereinafter described.

A conduit D is provided for supplying air under pressure to the chamber D¹ formed by the plates B, B¹ and the tire-band A. The conduit has a controlling-cock D² beyond which are three branches $d$, $d^1$, $d^2$ respectively. The branch $d$ communicates through a cock D³ with means not shown in the drawings for supplying high-pressure air. The branch $d^1$ communicates through a cock D⁴ with an air-reservoir D⁵ in which an auxiliary supply of air is stored. The branch $d^2$ is for blowing off only by means of a cock D⁶.

The bottom plate B¹ is arranged to be moved angularly about the ram C, that is circumferentially relatively to the tire-band A, and to enable it to be so moved it is provided with a radially-projecting lever B⁴.

Resting on the plate B¹, and if desired made integral therewith, is a central block E encircled by an expansible ring F which is divided at one point.

When the parts are in the position shown in Figure 1, the expansible ring is coiled round the block with its ends overlapping, as shown in Figure 3, and is restrained from assuming its circular form by means of an approximately radial pin F¹ on the end-segment which is innermost, which pin enters a hole in the side of the block. The outer end is restrained by a pin F² which is perpendicular to the plane of expansion of the ring and engages a hole in the side of the outer overlapping end. This pin is carried by a lever F³ which constitutes the releasing means for the ring, the said lever being pivoted in the block at F⁴ and arranged so that its free end F³* projects above the block when the pin F² is in position for engaging the ring.

The ring is composed of a number of channelled segments, see Figures 4, 6 and 7, which are hinged end-to-end about pivot-pins F⁵. The segments are disposed with their channelled sides towards the centre of the ring and the side walls of each channelled segment are bent towards each other at one end as shown at F⁶, Figure 7, to lie between those of the adjacent segment to serve as ears whereby the two segments can be connected by the pivot-pin F⁵. The pivot-pin lies towards the inner edge of the ring and the outer edges of the segments butt against each other to limit the degree of expansion permitted.

Springs G and G¹ are disposed one at each side of each pivot-pin and within the channels of the segments. One end of the spring G is connected to an ear-piece G² secured to the left-hand segment shown in Figure 7, and the other end of the same spring is connected to an ear-piece G³ secured to the right-hand segment shown in Figure 7. The spring G¹ has one end connected to an ear-piece G⁴ secured to the right-hand segment and the other end of this spring is connected to an ear-piece G⁵ secured to the left-hand segment. The ear-pieces G² and G⁴ lie on the outer side of the pivot-pin F⁵, so that the springs tend always to bring the segments into the position shown in Figures 5 and 6. When in this position the ring is fully expanded and the two segments whose adjacent ends are not connected together, are provided with flat butting faces so that they can butt one against the other.

The operation of this apparatus is as follows:—

A tire-band having been placed in position between the plates B, B¹, the plate B¹ is advanced by the ram C towards the plate B and at the same time air is admitted under pressure from the reservoir D⁵ by opening the cocks D⁴ and D², and cocks D³ and D⁶ being closed. This admission of air tends to expand the tire-band A and also presses it against the lips B³ of the plates B, B¹, to effect a proper seal therewith. As the plate B¹ is advanced towards the plate B, the pressure of the air increases in the chamber formed by the plates and the tire-band, so that the centre of the tire-band is thrust outwards, whereby the desired shaping is effected. During this operation, the expansible retaining-ring F is held in the contracted position by its restraining means, as shown in Figures 1 and 3, but when the plate B arrives at the limit of its movement and the tire-band A is fully stretched, the free end of the releasing lever F³ comes into contact with the plate B, so that the lever is rocked about its pivot F⁴, and the pin F² at the other end is thereby brought out from engagement with the ring F. The ring thus being released, immediately expands under the action of its springs to the circular form shown in Figure 5, in which form its fills the annular space constituted by the shaped central portion of the tire-band. The ends of the ring then gap apart as shown at F⁷, but when the air-pressure is released, the tire-band contracts and causes the ends of the ring to butt one against the other, so that the ring then constitutes a rigid hoop-like strut within the tire-band.

After the expansible ring has been brought into position, the cock D⁴ is closed and the cock D⁶ is opened to relieve the pressure, the plates are then separated, and the shaped tire-cover is removed on the ring, and with the ring still in situ can be finally vulcanized.

For tires of large cross-section, it may not be found necessary to admit air under pressure to the chamber between the plates, as the relative movement of the plates being greater than for tires of smaller cross-section as will be understood, the approach of one towards the other so rapidly raises the pressure in the chamber that a sufficiently fluid-tight joint may be secured immediately and the further approach of one plate to the other raises the pressure sufficiently to effect the required expansion without any initial pressure being set up before movement of the one plate towards the other commences; in fact, a relief-valve may be provided so that some air may escape to prevent undue pressure being set up.

In the case of small tires, air may first be admitted from the reservoir D⁵ during the movement of the plate B¹ as already described, and then the cock D⁴ may be closed and the cock D³ opened, so that air at higher pressure is admitted to the chamber D¹. After the tire-band has been shaped and the cock D³ closed, the cock D⁴ may be opened to admit some of the air under pressure from the chamber D¹ to the reservoir D⁵, so as to economize in compressed air, but as soon as a balance is obtained, the cock D⁴ is closed and the blow-off cock D⁶ opened.

The cock D² is used to shut off the conduit D when the reservoir D⁵ is being charged through the cock D³.

When the tire-band is made up of one or more layers of diagonal threads, it may be found desirable in the case of large sizes of tire to turn one plate relatively to the other to equalize the tension on the threads, and for this purpose one of the plates is arranged so that it may be revolved in relation to the other when the lever B⁴ is used. It will be appreciated that as the tire-band is shaped, the angle at which the threads cross from side to side of the band is slightly altered and the movement of the plate allows for this alteration of angle.

To get a proper seal at starting between the plates and the edges of the tire-band, it may sometimes be desired to use packing-strips in the recesses of the plates.

In Figure 8, a plate H is indicated having in it a recess H¹ to receive one edge of the tire-band, and the lip against which the bead of the tire-band is to bear, is constituted by a separate ring H² secured to the face of the plate. Between the plate and this ring is a packing strip or packing-ring J shaped in cross-section as shown in Figure 8, and which packing-ring projects out into the recess H¹.

Figure 9:
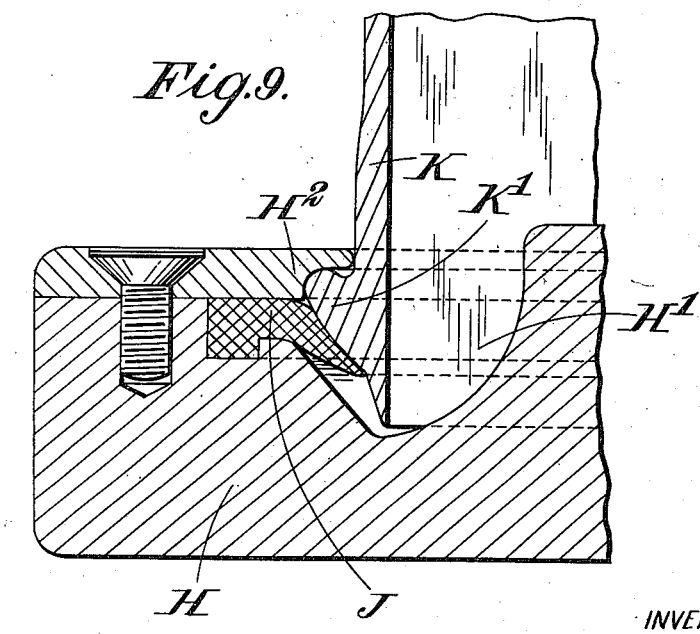
Figure 9 shows the same part in section with the tire-band in place before expansion commences.

In Figure 9, one edge of a tire-band K is shown in the position it occupies before expansion commences. It will be seen that in this position, the packing-ring J bears against that side of the outer face of the bead K¹ of the band K which is nearest the edge of the band and that the parts are so arranged that directly fluid-pressure is applied to the inner face of the tire-band, this will be pressed more firmly against the packing-ring J, and also the air having access round to the packing-ring will tend to press this against the bead; an effectual seal is thus brought about.

In Figure 10 the parts are shown in the position they occupy as the bead of the tire-band swings round during the expansion of the band. The air-pressure causes the ring J to follow this movement of the bead and so the seal is maintained until the bead is driven with sufficient force against the lip on the ring H² to ensure proper sealing.

Figure 12:
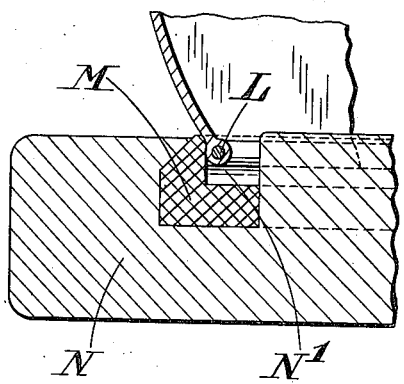
Figure 12 shows the same parts as in Figure 11 with the tire-band in the position it occupies when partly expanded.
Figure 13:
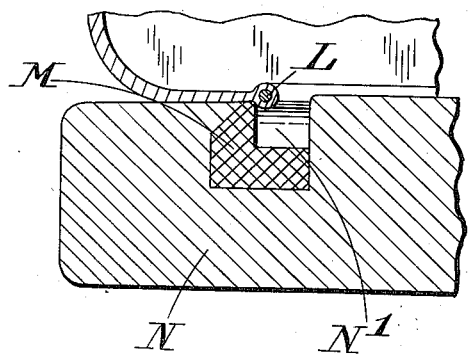
Figure 13 shows the same parts as in Figures 11 and 12 but with the tire-band in the position it occupies when approximately fully expanded.

The form of bead shown in Figures 8 to 10 is that which is designed to engage the inturned edges of a wheel-rim, but in Figures 11 to 13 the wired form of bead L is shown. For this, a packing-ring M of L-shaped cross-section is entered in the recess N¹ of the plate N, and the bead bears against this packing-ring throughout the operation, swinging about the edge of the ring as shown in Figures 12 and 13. Obviously other forms of packing may be introduced, the two shown being selected by way of example for two well-known types of bead.

It will be seen that in the apparatus according to this invention, the edges of the tire-band always have their outer faces in engagement with the edges of the grooves or recesses in the plates, so that the edges are not only held in the required position but no expansion of the same can take place even should the build of the edges be such as would allow of stretching.

The use of the retaining-ring enables the tire-bands to be vulcanized in an expanded condition without the aid of a pneumatic tube, and as the retaining-rings can be used almost indefinitely, a considerable saving of cost of manufacture results as compared with apparatus wherein a pneumatic tube has to be used to keep the tire-band in shape during vulcanization, for these tubes, as is well-known, do not last long when so used and they are expensive.

It will be appreciated that various means may be employed for releasing the restraining-means of the retaining-ring, and the operation of the same may be variously effected. As shown, the operation of the release from without the chamber is effected by the movement of the plate $B^1$, but the lever or other releasing-device could be operated by means extending through a gland in one of the plates. Similarly, various forms of catches could be used for securing the two ends of the ring F instead of the pins $F^1$ and $F^2$; also the expansible ring itself can be variously constructed, all that is required being that it shall be capable of being made to occupy a smaller area than that of the tire-band before it is expanded and of expanding to fit the tire-band and hold it extended after it is expanded.

It will be seen that tires shaped by the method described and which consists in expanding the central portion of the tire by the direct action of fluid-pressure and retaining it in this expanded condition for vulcanizing purposes by means of a device which is brought into operative position within the tire-band whilst the latter is in the expanded condition, have corresponding parts all round their circumference subjected to equal strain in manufacture, as the cover, with the exception of the edges, is free whilst it is being shaped so that the different parts can align themselves.

The retaining-ring may obviously be variously made and could for example take the form of a number of segmental parts moved out radially by a suitable mechanism; such devices are already well-known as used for collapsible formers and therefore need not be described in detail. The retaining-ring in whatever form it takes may be arranged to expand as the central portion of the tire expands, instead of being first restrained and then released when the band has been fully expanded; for example, the ring F could be used without the restraining and releasing means described, the ring being merely coiled up within the tire-band so that it can follow the same as this expands, until it finally assumes the position shown in Figure 2.

In wired-on tires, the engagement between the edges of the recessed plates and the bead need not be depended upon to hold the edges against radial expansion as in fact the parts of the tire-band which bear against these lips may in some cases be flat as the wires prevent undue radial expansion.

It will be understood that by "the direct action of fluid pressure" in the specification and claims, is meant that the fluid is so applied to the interior of the cover that no separate air-container such as an inner tube is required.

The term "fluid-tight joint" as used throughout the specification and claims for the joint made between the tire-band and plates, is intended to cover such a joint as is sufficiently fluid-tight for the purpose. In actual practice a slight leakage is immaterial; obviously the pressure within the tire-band may be obtained by creating a vacuum outside the band if desired.

What I claim as my invention and desire to secure by Letters Patent is:—

1. In tire-shaping apparatus, the combination of two side plates adapted to make fluid-tight joints with the two edges of a flat endless tire band and to form therewith a drum-shaped chamber, which plates are so arranged as to enable one plate to move towards and away from the other, and means for establishing a fluid pressure within said chamber, substantially as described.

2. In tire-shaping apparatus, the combination of two side plates adapted to make fluid-tight joints with the two edges of a flat endless tire band and to form therewith a drum-shaped chamber, which plates are so arranged as to enable one plate to move towards and away from the other, and means for forcibly advancing one plate towards the other at will and thereby raising the pressure of the fluid within the said chamber, substantially as described.

3. In tire-shaping apparatus, the combination of two side plates adapted to make fluid-tight joints with the two edges of a flat endless tire band and to form therewith a drum-shaped chamber, which plates are so arranged as to enable one plate to move towards and away from the other, means for forcibly advancing one plate towards the other at will, and means for supplying a fluid under pressure to the said chamber, substantially as described.

4. In tire-shaping apparatus, the combination of two side plates adapted to make fluid-tight joints with the two edges of a flat endless tire band and to form therewith a drum-shaped chamber, which plates are so arranged as to enable one plate to move towards and away from the other, a valve-controlled conduit for admitting a fluid under pressure to the chamber thus formed by the plates and the band, and means for forcibly advancing one plate towards the other at will and thereby increasing the fluid pressure within the said chamber, substantially as described.

5. In tire-shaping apparatus, the combination of two side plates adapted to make fluid-tight joints with the two edges of a flat endless tire band and to form therewith a drum-shaped chamber, which plates are so arranged as to enable one plate to move towards and away from the other, means for increasing the fluid pressure within the said chamber, for expanding the band, and mechanical, non-pneumatic expansible retaining means disposed between the plates and arranged to expand against the inner periphery of the band while the latter is in the expanded condition, substantially as described.

6. In tire-shaping apparatus, the combination of two side plates adapted to make fluid-tight joints with two edges of a flat endless tire band and to form therewith a drum-shaped chamber, which plates are so arranged as to enable one plate to move towards and away from the other, means for increasing the fluid pressure within the said chamber for expanding the band, and automatically expansible retaining means disposed between the plates and arranged to expand against the inner periphery of the band while the latter is expanded, substantially as described.

7. In tire-shaping apparatus, the combination of two side plates adapted to make fluid-tight joints with the two edges of a flat endless tire band and to form therewith a drum-shaped chamber, which plates are so arranged as to enable one plate to move towards and away from the other, means for forcibly advancing one plate towards the other at will and thereby increasing the fluid pressure within the said chamber for expanding the band, and an automatically expansible retaining ring disposed between the plates and arranged to expand against the inner periphery of the band while the latter is in its expanded condition, substantially as described.

8. In tire-shaping apparatus, the combination of two side plates adapted to make fluid-tight joints with the two edges of a flat endless tire band and to form therewith a drum-shaped chamber, which plates are so arranged as to enable one plate to move towards and away from the other, means for increasing the fluid pressure within said chamber for expanding the band, automatically expansible retaining-means disposed between the plates and arranged to expand against the inner periphery of the band while the latter is in the expanded condition, restraining means normally holding said retaining means in its contracted position, and means for releasing said restraining means from said retaining means, substantially as described.

9. In tire-shaping apparatus, the combination of two side plates adapted to make fluid-tight joints with the two edges of a flat endless tire band and to form therewith a drum-shaped chamber, which plates are so arranged as to enable one plate to move towards and away from the other, means for increasing the fluid pressure within the said chamber for expanding the band, and automatically expansible retaining means disposed between the plates and arranged to expand against the inner periphery of the band while the latter is in its expanded condition, said retaining means comprising a plurality of segments hinged one to another at their ends, and a plurality of springs disposed on the inner side of the ring and engaging each with two adjacent segments so as to tend to swing the segments outwardly about their hinges, substantially as described.

10. In tire-shaping apparatus, the combination of two side plates adapted to make fluid-tight joints with the two edges of a flat endless tire band and to form therewith a drum-shaped chamber, which plates are so arranged as to enable one plate to move towards and away from the other, means for increasing the fluid pressure within said chamber for expanding the band, and automatically expansible retaining means disposed between the plates and arranged to expand against the inner periphery of the band while the latter is in the expanded condition, said retaining means comprising a plurality of segments pivotally connected one to another in a helical row, each segment carrying two ear pieces at each pivoted end, whereof one ear piece is situated between the two ends of the segment whereon it is mounted and the other ear piece is situated adjacent to, but on the outer side of, the axis of pivoting of one end of the segment whereon it is mounted, and a plurality of springs, each connected at one end to an ear piece mounted on one segment and at its other end to an ear piece mounted on the adjacent end of a segment pivoted thereto, substantially as described.

11. In tire-shaping apparatus, the combination of two side plates adapted to make fluid-tight joints with the two edges of a flat endless tire band and to form therewith a drum-shaped chamber, which plates are so arranged as to enable one plate to move towards and away from the other, means for increasing the fluid pressure within said chamber for expanding the band, and an automatic expansible retaining ring disposed between the plates and arranged to expand against the inner periphery of the band while the latter is expanded, said retaining ring comprising a plurality of spring-controlled segments pivoted one to another at their ends, restraining means normally holding said segments in their contracted position, and means for releasing said restraining means from said segments, substantially as described.

12. In tire-shaping apparatus, the combination of two side plates adapted to make fluid-tight joints with the two edges of a flat endless tire band and to form therewith a drum-shaped chamber, which plates are so arranged as to enable one plate to move towards and away from the other, means for increasing the fluid pressure within said chamber for expanding the band, and an automatic expansible retaining ring disposed between the plates and arranged to expand against the inner periphery of the band while the latter is expanded, said retaining ring comprising a plurality of spring-controlled segments pivoted one to another at their ends, restraining means normally holding said ring in its contracted position, and means for automatically releasing said restraining means from said ring in a predetermined position of one plate relatively to the other, substantially as described.

13. In tire-shaping apparatus, the combination of two side plates adapted to make fluid-tight joints with the two edges of a flat endless tire band and to form therewith a drum-shaped chamber, which plates are so arranged as to enable one plate to move towards and away from the other, means for increasing the fluid pressure within said chamber for expanding the band, an automatically expansible retaining ring divided at one point so that it can be coiled with one end overlapping the other and having its ends arranged to make a butt joint when the ring is expanded, restraining means normally holding the split retaining ring in its contracted position, and means for releasing said restraining means from said ring, substantially as described.

14. In tire-shaping apparatus, the combination of two side plates adapted to make fluid-tight joints with the two edges of a flat endless tire band and to form therewith a drum-shaped chamber, which plates are so arranged as to enable one plate to move towards and away from the other, means for increasing the fluid pressure within said chamber for expanding the band, an automatically expansible retaining ring disposed between the plates and arranged to expand against the inner periphery of the band while the latter is expanded, restraining means normally holding said ring in its contracted position, and means operable from without the chamber formed by the plates and the tire band for releasing said restraining means from said ring, substantially as described.

15. In tire-shaping apparatus, the combination of two side plates adapted to make fluid-tight joints with the two edges of a flat endless tire band and to form therewith a drum-shaped chamber, which plates are so arranged as to enable one plate to move towards and away from the other, means for increasing the fluid pressure within said chamber for expanding the band, an automatically expansible retaining ring divided at one point so that it can be coiled with one end overlapping the other, restraining means comprising a catch arranged to hold the inner end of the ring to one of said plates against circumferential movement but so that it can be released by radial movement, and a catch arranged to hold the other end of the ring to the same plate against both radial and circumferential movement, and means for releasing the restraining means, substantially as described.

16. In tire-shaping apparatus, the combination of two side plates adapted to make fluid-tight joints with the two edges of a flat endless tire band and to form therewith a drum-shaped chamber, which plates are so arranged as to enable one plate to move towards and away from the other, means for increasing the fluid pressure within the chamber thus formed by the plates and the band, an automatically expansible retaining ring divided at one point so that it can be coiled with one end overlapping the other, restraining means normally holding said ring in its contracted position, and automatic releasing means operable from without the said chamber for releasing the said restraining means, substantially as described.

17. In tire-shaping apparatus, the combination of two side plates adapted to make fluid-tight joints with the two edges of a flat endless tire band and to form therewith a drum-shaped chamber, which plates are so arranged as to enable one plate to move towards and away from the other, means for increasing the fluid pressure within said chamber for expanding the band, an automatically expansible retaining ring divided at one point so that it can be coiled with one end overlapping the other, restraining means comprising a catch arranged to hold the inner end of the ring to one of said plates against circumferential movement but so that it can be released by radial movement, a lever pivoted on the same plate and having one end normally projecting towards the other plate, and a catch mounted on the other end of the said lever and arranged to hold the other end of the ring against both radial and circumferential movement, substantially as described.

18. In tire-shaping apparatus, the combination of two side plates so arranged as to enable one plate to move towards and away from the other and having each in their opposed faces an endless recess adapted to receive the edges of a flat endless tire band and engage their outer faces and form a fluid-tight drum-shaped chamber with the band, and means for raising the internal fluid pressure in said chamber, substantially as described.

19. In tire-shaping apparatus, the combination of two plates arranged face to face and having each in their opposed faces an annular recess adapted to receive the edges of a flat endless tire band and form with it a drum-shaped chamber, one of which plates can move towards and away from the other, a packing ring of yielding material in each recess arranged to contact with the edges of the band and form fluid-tight joints therewith, and means for raising the fluid pressure in said chamber, substantially as described.

20. In tire-shaping apparatus, the combination of two side plates adapted to make fluid-tight joints with the two edges of a flat endless tire band and to form therewith a drum-shaped chamber, which plates are so arranged as to enable one plate to move towards and away from the other, one of which plates is rotatable relatively to the other about an axis transverse to the general plane of the band, and means for raising the pressure of the fluid in said chamber, substantially as described.

21. In tire-shaping apparatus, the combination of two side plates adapted to make fluid-tight joints with the two edges of a "flat" endless tire-band and to form therewith a chamber, which plates are so arranged as to enable one plate to move towards and away from the other, and means for establishing fluid-pressure on the inner face of the tire-band relatively to that on the outer face, substantially as described.

In testimony whereof I affix my signature.

THOMAS SLOPER.